United States Patent [19]

Eggerichs

[11] Patent Number: 4,879,045
[45] Date of Patent: Nov. 7, 1989

[54] METHOD AND APPARATUS FOR ELECTROMAGNETICALLY TREATING A FLUID

[76] Inventor: Terry L. Eggerichs, P.O. Box 132, Chester, Ia. 52134

[21] Appl. No.: 119,320

[22] Filed: Nov. 9, 1987

Related U.S. Application Data

[63] Continuation of Ser. No. 817,996, Jan. 13, 1986, abandoned.

[51] Int. Cl.$^4$ .................. C02F 1/48; B01D 35/06; B03C 1/30
[52] U.S. Cl. .................. 210/695; 204/152; 204/186; 210/223; 210/243; 210/259; 210/696; 210/702; 210/748; 210/749; 210/764; 422/22
[58] Field of Search .................. 422/22; 210/222, 223, 210/335, 456, 695, 702, 739, 749, 764, 748, 243, 259, 696; 204/149, 152, 186

[56] References Cited

U.S. PATENT DOCUMENTS

| | | | |
|---|---|---|---|
| 438,579 | 10/1890 | Faunce et al. | 210/222 |
| 1,949,660 | 3/1934 | Roberts | 210/223 |
| 2,583,522 | 1/1952 | Winslow et al. | 210/223 |
| 2,596,743 | 5/1952 | Vermeiren | 210/222 |
| 2,652,925 | 9/1953 | Vermeiren | 210/222 |
| 2,825,464 | 4/1958 | Mack | 210/223 |
| 2,939,830 | 6/1960 | Green et al. | 210/695 |
| 3,349,354 | 10/1967 | Miyata | 210/222 |
| 3,506,562 | 4/1970 | Coackley | 204/149 |
| 3,669,274 | 6/1972 | Happ et al. | 210/222 |
| 3,680,705 | 8/1972 | Happ et al. | 210/222 |
| 3,753,886 | 8/1973 | Myers | 204/149 |
| 3,923,660 | 12/1975 | Kottmeier | 210/222 |
| 3,951,807 | 4/1976 | Sanderson | 210/222 |
| 4,073,712 | 2/1978 | Means et al. | 204/186 |
| 4,151,090 | 4/1979 | Brigante | 210/222 |
| 4,157,963 | 6/1979 | Jessop et al. | 210/222 |
| 4,167,480 | 9/1979 | Mach | 210/223 |
| 4,210,535 | 7/1980 | Risk | 210/222 |
| 4,216,092 | 8/1980 | Shalboob et al. | 210/222 |
| 4,226,720 | 10/1980 | Brigante | 210/222 |
| 4,265,722 | 5/1981 | Faul et al. | 204/129.6 |
| 4,265,754 | 5/1981 | Menold | 210/695 |
| 4,278,549 | 7/1981 | Abrams et al. | 210/695 |
| 4,288,323 | 9/1981 | Brigante | 210/222 |
| 4,289,621 | 9/1981 | O'Meara, Jr. | 210/222 |
| 4,299,701 | 11/1981 | Garrett et al. | 210/222 |
| 4,347,133 | 8/1982 | Brigante | 210/222 |
| 4,407,719 | 10/1983 | Van Gorp | 210/695 |
| 4,417,984 | 11/1983 | O'Meara, Jr. | 210/695 |
| 4,427,544 | 1/1984 | Roch | 210/222 |
| 4,428,837 | 1/1984 | Kronenberg | 210/222 |

FOREIGN PATENT DOCUMENTS

| | | |
|---|---|---|
| 625732 | 7/1949 | United Kingdom. |
| 675369 | 7/1952 | United Kingdom. |

OTHER PUBLICATIONS

45th Annual Meeting International Water Conference, Pittsburgh, Pa., Busch et al., Oct. 22, 23, 24, 1984.

*Primary Examiner*—W. Gary Jones
*Attorney, Agent, or Firm*—Andrus, Sceales, Starke & Sawall

[57] ABSTRACT

A device for treating fluids with magnetic lines of force includes an electrically isolated non-magnetic, metallic conduit through which the fluid passes. An electromagnetic coil surrounds the conduit and is electrically insulated from the conduit. The coil is clad with a magnetic housing or shunt, and fins surrounding the coil dissipate heat generated by the coil. A core consisting of a single cylindrical magnetic section or a series of endwise connected alternating short sections of magnetic and non-magnetic material is disposed within the conduit along the conduit's axis at a location which is offset downstream from the coil. A helical baffle located between the conduit and the core, or, alternately, a driven impeller, provides circular flow for the fluid so that the fluid crosses the lines of magnetic force extending between the ends of the core and the metallic shunt in a 90° relationship therewith. The baffle does not extend over the coil, and the conduit is provided with its own independent ground. Also, iron salts are added to the fluid prior to reaching the core to enhance the prevention of scale.

41 Claims, 2 Drawing Sheets

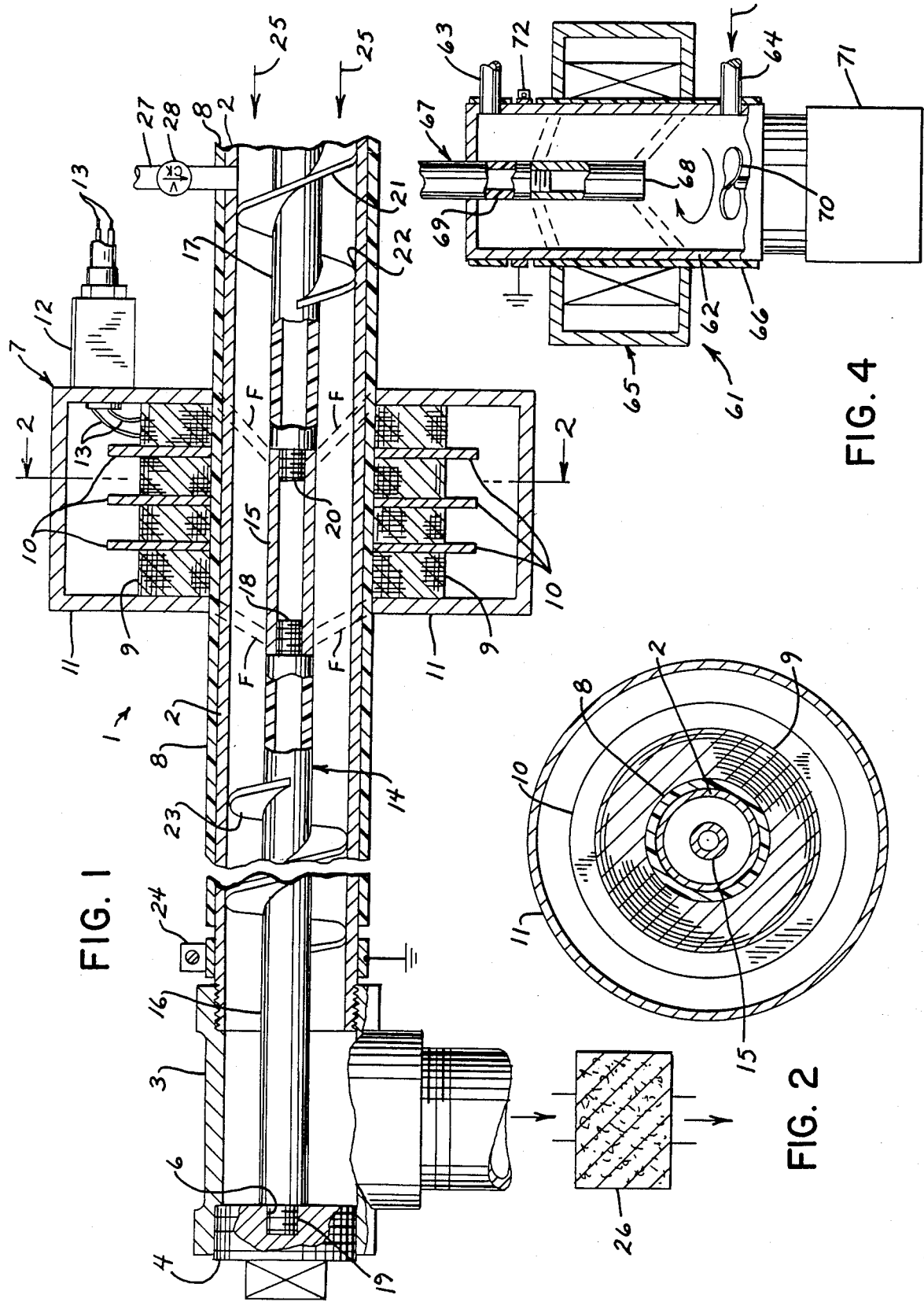

METHOD AND APPARATUS FOR ELECTROMAGNETICALLY TREATING A FLUID

This application is a continuation of copending application Ser. No. 817,996, filed Jan. 13, 1986, now abandoned.

BACKGROUND OF THE INVENTION

This invention relates to fluid treating devices, and more particularly to an electromagnetic water treating device.

Magnetic water treating devices are well known in the prior art. Such devices pass the fluid to be treated through a magnetic field which may be provided by electromagnetic coils or permanent magnets.

Permanent magnet systems, represented by a variety of designs, are based on magnetohydrodynamic theory. This theory interprets function as that of an electrical generator (dynamo) where the water stream constitutes the conductor in which current is generated. This concept requires a vector component of flow which is at an angular relationship of 90° in relation to the force field emitting from the magnetic core. The theory further suggests that the level of treatment is proportional to the voltage and current generated within the water stream. Thus, the greater the velocity of the fluid stream, the greater the field, and the closer to 90° the encounter, the more effective is the treatment.

Permanent magnet systems may further be divided into two design types: (1) those with the magnet separate from, and electrically isolated from, the fluid flow, and (2) those where the magnetic core is situated within, and electrically contacting, the fluid flow.

Magnetic treatment where the device is located separate from the fluid, generally called "clamp on" systems, has the advantage of ease of installation when the device is located outside the conduit carrying the fluid to be treated, and fulfills the magnetohydrodynamic theory requirements when located in such a manner that the force field (lines of force) is not parallel to the direction of flow. A number of "clamp-on" systems designed to be installed outside the conduit are commercially available. These systems, however, cannot function when applied to a pipe or conduit composed of magnetic material because the force field conducts around the fluid stream. A number of patents also illustrate this general type. U.S. Pat. No. 3,669,274 (Happ et. al., 1972) situates the magnets internal to the fluid stream, but separate from it, as does U.S. Pat. No. 3,923,660 (Kottmeier, 1975).

Designs where the magnets are situated within the fluid being treated and in direct contact with it are represented by U.S. Pat. No. 4,417,984 (O'Meara, Jr., 1983) and 3,951,807 (Sanderson, 1976). In both, permanent magnets are aligned in a bucking manner (S to S and N to N) to project the force field perpendicular to fluid flow, and thus fulfill the requirements of magnetohydrodynamic theory.

Attempts to adapt permanent magnet concepts to electromagnets are represented by two general classes found in the patent literature: (1) those with a rotating core, usually an impeller or auger, and (2) those with a stationary core of one or more magnetic components.

Rotating impeller electromagnetic systems do not conform to the general principles of magnetohydrodynamic theory, but, instead, derive their action from currents generated in the helical core. A number of patents in this general category include U.S. Pat. Nos. 4,151,090 (Fava. 1979), 4,226,720 (Brigante, 1980), and 4,347,133 (Brigante, 1982). In these designs, the fluid-carrying conduit is surrounded by rods of magnetic material which effectively shields the fluid stream from the force field, and the conduit itself is magnetic. This design relies on the interaction of the field in the conduit with a water-propelled, rotating auger. The auger functions as an armature, feeding current into the fluid stream. This type of design produces the electrolysis products of water as a byproduct of treatment. The device fails, however, when mechanical failure stops the auger from rotating or when auger surfaces are coated, as from corrosion.

Another similar design is described in U.S. Pat. No. 4,427,544 (Roch, 1984). The currents produced are, as above, fed directly from a metallic surface to the fluid stream in a manner comparable to an electrode in general electrolysis designs, giving the full catalytic effect of the metal surface in the electrolysis of water or other solvents.

Stationary core electromagnetic systems include two distinct types of design which are represented in the patent literature. U.S. Pat. No. 2,652,925 (Vermeiren, 1953) represents a system where neither current generation nor magnetohydrodynamic theory can function because fluid flow is parallel to the force field. U.S. Pat. No. 4,407,710 (Van Gorp, 1983) is of identical design to the former patent except that the fluid being treated enters at a 90° angle to the force field, and thus a slight effect would be anticipated from magnetohydrodynamic theory. The design precludes the attaining of a reasonably high level of magnetic flux at any point within the fluid flow because the poles of the magnet are buried within the plugs at the ends of the tees, and the core extends far beyond the ends of the coil, diminishing the field along the core.

Comparisons of permanent magnet systems with electromagnet systems are generally approached by their differences in topography of the corresponding force fields. A permanent magnet is regarded as a self-contained magnetic circuit capable of overlap with other magnetic circuits within a close enough distance. The force field for a given permanent magnet core represents an envelope of flux distributed over a volume spanning the length of the core, plus the volume of the polar end nodes. The volume occupied by the flux is thus large, resulting in low flux density throughout the system. Overlap between two or more permanent magnets does not sufficiently change this characteristic. The bucking of two or more permanent magnets changes the overall shape of the envelope, but the volume to field ratio remains large, disallowing a reasonably large flux density.

In an electromagnetic system, the core is a conductor of field, with nearly the full magnitude of flux entering and leaving from the polar ends. Only a minor portion of the total flux distributes itself along the length of the core. This results in the flux being concentrated in a small volume at the polar ends. High reluctance gaps in the circuit, comparable to the overlap of two permanent magnets, results in ballooning of the force field, giving further useful areas for utilization in effective collisions with the fluid stream. These considerations make electromagnetic systems potentially more effective than permanent magnet systems. This is further substantiated by limitations on function. Permanent magnet systems, when they function at all, are useful only in the limited prevention and removal of scale and in a lessening of corrosion in iron base plumbing systems.

SUMMARY OF THE INVENTION

It is an object of the invention to provide a new and improved fluid treating device.

Another object of the invention is to provide a fluid treating device which contains no moving parts.

It is the main object of this invention to provide a design for an electron pump for the treatment of fluids in all areas from the source of flow to the termination of flow with the function of counteracting the effects of scaling, algae growth, corrosion, chemical contamination, adverse pH, odors, foul tastes, high iron and other mineral content, bacterial contamination, and suspended, emulsified, or supersaturated solutes.

It is a further object of this invention to provide a process for enhanced scale removal by the addition of iron salts in the fluid to be treated.

It is yet another object of this invention to provide a process for the prevention of magnetic core fouling by the addition of iron salts in the fluid to be treated.

It is still another object of this invention to provide a process by which chemical reactions can be carried out.

It is a further object of this invention to provide an electron pump in combination with size filtration devices such as ion exchange resins or other resins for removal of offending substances from fluids while increasing the functional capacity of the resin bed.

It is a further object of this invention to provide an electron pump in combination with magnetic filtration devices for the removal of offending solids from fluids.

It is a further objection of this invention to provide a process by which waste streams can be detoxified.

It is a further objection of this invention to provide a process by which toxic materials can be made insoluble in a fluid stream for filtration or precipitation.

These and other objects and advantages of the invention will become more apparent from the detailed description thereof taken with the accompanying drawings.

In one aspect, the invention comprises a device for treating fluids with magnetic lines of force and includes conduit means through which the solution flows, an electromagnetic coil surrounding the conduit means in a concentric relation therewith, and a core member offset downstream from the coil within the conduit extending along the axis of the conduit. The core member may comprise a single magnetic section, or alternately, a series of endwise connected alternating short sections of magnetic and nonmagnetic material in which case a corresponding number of coils must be utilized. Offsetting the core member from beneath the coil presents the magnetic lines of force extending from the core to the coil at the proper angle in a cone shape with respect to the forward, circular flow of the fluid. This angle of presentation may be from about 30° to about 85° with respect to the longitudinal axis of the core member so long as the flow of the fluid to be treated intersects this cone of field at about 90° thereto. The core member, being composed of ferromagnetic material, may be of either solid construction or of iron powder-filled tubular construction. The core member may be connected by means of a threaded connection on either or both of its ends to a nonmagnetic component to hold the core member in place centrally within the diameter of the conduit. The length of the core member is equal to or less than the length of the coil, allowing for large field capability.

In another aspect of the invention, the fluid treatment device includes conduit means through which the fluid passes, an electromagnetic coil surrounding the conduit means, core means disposed within the conduit means, and fluid flow control means disposed within the conduit means for providing circular flow for the fluid so that the fluid intersects the magnetic lines of force extending between the coil and core at a 90° relationship therewith. The flow control means may comprise a helical baffle means or a driven impeller means. In either embodiment the flow control means do not extend over the core between the core and conduit means to prevent any electrical shorting of currents necessary for the effects sought.

In still another aspect of the invention, the conduit means is comprised of a nonmagnetic, metallic, electrically conductive material such as stainless steel, copper, brass and the like. The conduit means is electrically insulated or isolated from both the core and the plumbing system into which the conduit means is utilized. The conduit means, however, is independently grounded. The connection of the electrically isolated conduit, housing the magnetic core, to ground, results in a powerful, directional electron pump capable of electron extraction from the source of fluid flow. The directional extraction of electrons from the source of flow results in oxidation reactons in the fluid prior to reaching the core chamber.

In still another aspect, the invention includes a method of treating a fluid which comprises the steps of passing a fluid through a magnetic force field such that the fluid moves through the magnetic lines of force in about a 90° relationship thereto, and introducing ferrous ions ($Fe^{+2}$) from an auxiliary source of ferrous ions such as from an iron salt into the fluid prior to the fluid passing through the magnetic lines of force. The artificial increase of ferrous ions ($Fe^{+2}$) in the fluid enhances the prevention of scale and allows for enhanced descaling of system surfaces. Also, prevention of magnetic core fouling by the auxiliary addition of ferrous ions is provided.

The coil assembly is composed of electrically insulated wire wound around the conduit, and is electrically insulated from the conduit. The coil assembly is capable of producing magnetic fields of at least 2000 gauss within the core member. Heat generation within the coil may be dissipated by means of known technology within the public domain such as heat transfer fins or plates that may if necessary be connected with a source of air flow. The coil is clad with a metallic housing or shunt, also in the public domain, forming a magnetic circuit that minimizes the ballooning of the force field at the high reluctance area between the ends of the core and the points of flux emergence from and return to the coil.

BRIEF DESCRIPTION OF THE DRAWINGS

The drawings illustrate the best mode presently contemplated of carrying out the invention.

In the drawings:

FIG. 1 is a side elevational view in section with parts broken away of a fluid treating device constructed in accordance with the preferred embodiment of the present invention;

FIG. 2 is a cross sectional view taken along the plane of the line 2—2 in FIG. 1;

FIG. 4 is a side elevational view in section with parts broken away of a third embodiment of a fluid treating device constructed in accordance with the present invention.

DESCRIPTION OF THE PREFERRED EMBODIMENTS

Figure 3:
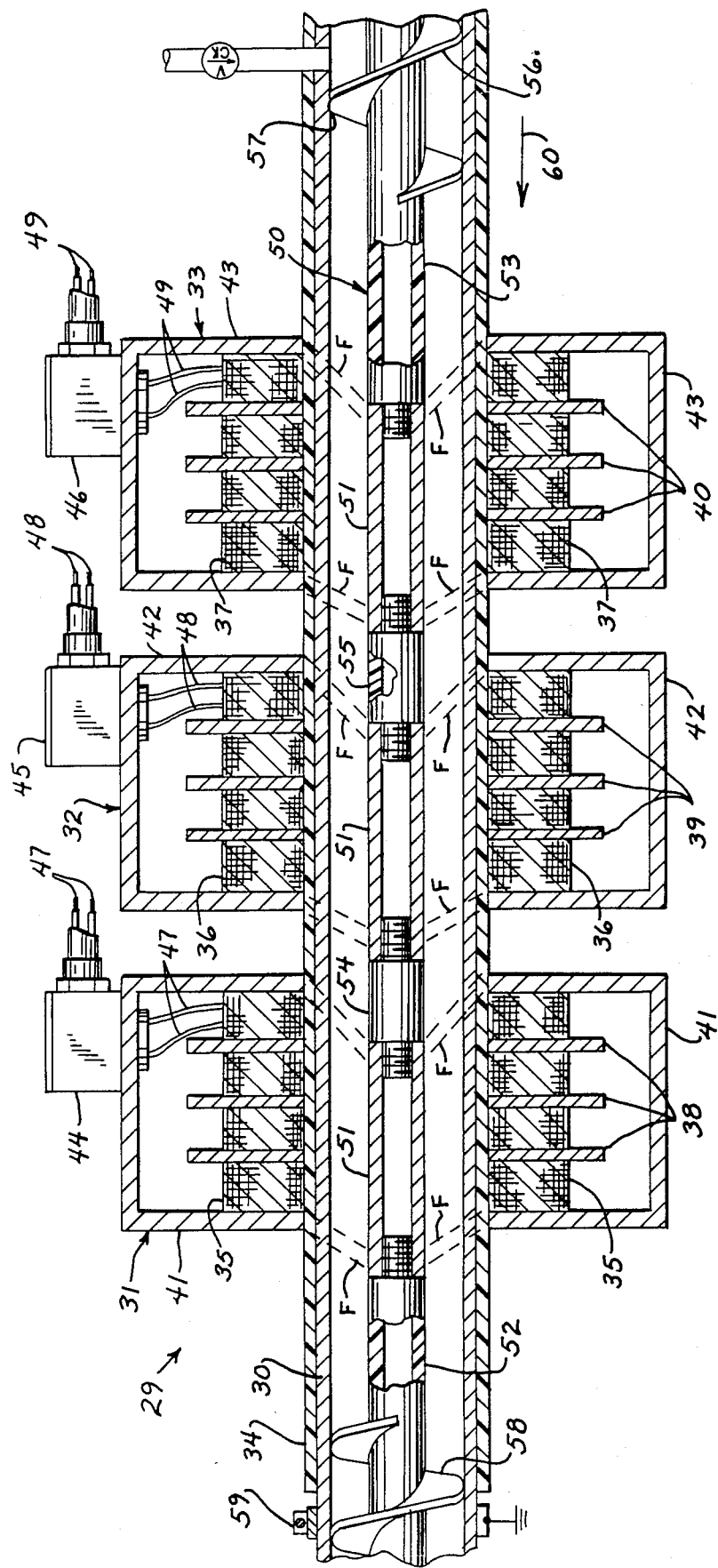
FIG. 3 is a side elevational view in section with parts broken away of a second embodiment of a fluid treating device constructed in accordance with the present invention.

Referring now to the drawings, FIGS. 1 and 2 illustrated a magnetic fluid treatment device constructed in accordance with the preferred embodiment of the present invention. The fluid treatment device, generally designated by the numeral 1, includes a conduit 2 through which the fluid being treated flows. Conduit 2 is composed of a non-magnetic, metallic, electrically conductive material such as stainless steel, copper, brass and the like. Conduit 2 is disposed in such as manner as to be electrically isolated or insulated from both the magnetic core assembly, as will hereinafter be described, and the plumbing system in which the conduit is utilized. The downstream end or outlet end of conduit 2 has external threads thereon for receiving an internally threaded coupling member 3. The coupling 3 is a T-joint assembly having a tapered, threaded plug 4 at one end. Extending radially from the midsection of coupling 3 is a fluid exit pipe 5 threadedly engaged therewith. Pipe 5 is composed of a non-magnetic, non-metallic material such as any well known plastics material like polyvinylchloride (PVC) in order to insulate conduit 2 from the remainder of the plumbing system (not shown) into which conduit 2 is inserted. Plug 4 includes a threaded blind bore 6 formed therein for threadedly engaging and securing one end of the core assembly, as will hereinafter be described. The opposite end or upstream end of conduit 2 is threaded for securing the inlet end of conduit 2 to the plumbing system. It will therefore be appreciated that removal of plug 4 from coupling 3 will permit the core assembly to be withdrawn and replaced, if desired.

An electromagnetic coil assembly 7 is disposed in concentric surrounding relation to conduit 2 and is insulated therefrom by an electrically insulating material 8 disposed between the coil assembly 7 and conduit 2. The coil assembly 7 is capable of producing magnetic fields of at least 2000 gauss within the core, and includes electrically insulated wire 9 wound around conduit 2, and a plurality of fins 10 engage wires 9 to dissipate heat in a known manner. A source of air flow (not show) may also be utilized to increase the heat transfer between wires 9 and fins 10 if desired. The coil wires 9 are clad with a metallic housing or shunt 11 surrounds coil wires 9 in a known manner. Housing 11 provides for completion of the magnetic circuit to minimize the ballooning of the force field at the high reluctance area between the ends of the core and the points of flux emergence from and return to the coil. In addition, a suitable terminal 12 is affixed to housing 11 for receiving conductors 13 which connect coil wires 9 to a source of electrical energy.

A core assembly 14 is disposed within conduit 2 and extends along the axis of conduit 2. As shown in FIG. 1, the core assembly includes a single cylindrical section or core member 15 composed of a ferromagnetic material. Core member 15 may be of either a solid construction or of an iron powder-filled tubular construction. Core member 15 has a length equal to or less than the length of coil assembly 7 thus allowing for large field capability. The metallic core member 15 preferably comprises a short tubular member which has internal threads formed at each of its opposite ends for connection to a downstream coupling section 16 and an upstream coupling section 17. The coupling sections 16 and 17 are composed of a non-magnetic, non-metallic material, such as nylon. The coupling sections 16 and 17 are also generally cylindrical members which may be tubular or solid and have external threads on each of their opposite ends for engaging the internal threads of core member 15 and plugs 4. For example, as shown in FIG. 1, downstream section 16 includes an external threaded end 18 engaging the internal threads of the downstream end of core member 15 and external threads 19 at its opposite or downstream end for engaging the internal threads in bore 6 of plug 4. Upstream section 17 also includes external threads 20 on its downstream end for engaging the internal threads of the upstream end of core member 15.

As shown in FIG. 1, a helical baffle 21 is disposed between core section 17 and conduit 2. Baffle 21 defines a helical flow path for the fluid to be treated as it passes through conduit 2. Baffle 21 is preferably composed of nonmagnetic material such as plastic or stainless steel and is fixed in position in any suitable manner, such as by tach welding at 22 the opposite ends of its flights to the inner surface of conduit 2. The radially inner edge or internal circumference of baffle 21 is spaced from core section 17 so that the latter may be removed and replaced if desired. A second helical baffle 23 is disposed between core section 16 and conduit 2. Baffle 23 is composed of the same material as baffle 21 and is fixed in position in the same manner as previously described. The only difference between baffle 21 and baffle 23 is that the distance between the flights of baffle 23 is less than the distance between the flights of baffle 21 so as to insure the provision of a circular flow pattern for the fluid to be treated. It should be particularly noted that the baffles 21 and 23 do not extend over or between core member 15 and conduit 2. This prevents electrical shorting of currents needed for treatment effects between the ends of core member 15 and conduit 2 Baffles 21 and 23 may also be composed of a plastics material such as nylon. In this latter case, baffles 21 and 23 may be molded integral with coupling sections 16 and 17 or connected thereto in any conventional manner.

FIG. 1 also illustrates a grounding clamp 24 surrounding conduit 2 and connected to ground. Clamp 24 independently grounds conduit 2 from both the core assembly 14 and the plumbing system with which conduit 2 is utilized. This ground connection results in a powerful, directional electron pump capable of electron extraction from the source of fluid flow. The directional extraction of electrons from the source of flow results in oxidation reactions in the fluid prior to reaching the core. Among the reactions observed utilizing an iron based core 15 at 2,000–4,000 gauss are the transformation of manganese dioxide to permanganate, and the transformation of sulfide to sulfate.

In operation, coil 9 is energized by an alternating or direct current. This magnetizes the metallic tubular core member 15. As a result, magnetic lines of force F, as shown in FIG. 1, will extend generally at an angle of between 30° and 85° from the opposite ends of core member 15 to and between the lower ends of housing 11. In the case of direct current, the magnetic field will achieve a steady state condition while in the case of alternating current, the magnetic field will also be alternated.

Along with the energization of coil wires 9, fluid being treated will be delivered through conduit 2 generally in the direction of arrows 25 and withdrawn through exit pipe 5. The fluid flowing through conduit 2 will follow the helical path defined by baffles 21 and 23. As the fluid, typically water, moves along this helical path, it will cross the magnetic lines of force F emanating from each of the ends of the metallic core member 15 and at an angle which approaches, and which preferably is, about 90°. In addition, because the helical path defined by baffles 21 and 23 increase the distance travelled by the fluid as it passes through conduit 2, flow velocity within conduit 2 will thereby be increased.

The fluid treatment device 1 is particularly effective in inhibiting the formation of scale. The prevention of scale requires that precipitation occur in the bulk of the solution rather than on surfaces. The emphasis put on magnetohydrodynamic theory seems to indicate that electron transfers somehow function in this regard. U.S. Pat. No. 4,427,544 (Roch, 1984) suggests that "ferrous oxide produced acts as particulate seeds to induce bulk precipitation of cations . . . The ferrous ferric oxide then prevents the scaling of said heat transfer surfaces since this oxide has the characteristic of competing in providing a suitable surface for deposition of cations." This explanation reports descaling function as the repulsion of charge between two species, one on exchange surfaces and the other within the bulk of solution. This repulsion is said to occur because both species have the ability to coordinate with excesses of cationic (positive) charge. The source expressed for both species is the armature of the device. In contrast to this theory, however, it is believed that all workable magnetic devices inhibit scale by the same mechanism which is outlined below.

The first step in scale inhibition is the synthesis of a magnetite-like magnetic iron species such as $Fe_3^{+8}$, within the fluid stream from ferrous iron entering the device as part of the fluid, by the following reaction:

$$3\ Fe^{+2} \rightarrow Fe_3^{+8} + 2e^-$$

The iron species thus formed aligns itself into nonlinear strands which must be surrounded with anions to complete valence requirements. The nonionic species thus formed have the ability to form the core of a crystal lattice containing a balanced composition of cationic and anionic species. When the disorganized exterior of this core has been transformed into a highly structured crystal by taking on the needed cations and anions, the fluid loses its descaling ability. The ability of treated fluids to descale deposits of hard scale must, then, be due to a transfer of the deposited scale through a saturated state to the completion of the afore-mentioned incomplete lattices by Oswald ripening concepts. The completed crystal lattices are readily seen microscopically to contain an iron core. Precipitation of the resulting crystals formed from existing scale is fully consistent with enthalpy requirements.

The artificial enhancement of iron concentrations in the fluid, by means of iron salts, results in several effects. Iron concentrations are found to determine particle size. The higher the bivalent cation to iron ratio, the larger is the particle size. Therefore, the artificial control of iron concentration prior to the core member 15 may be utilized to regulate particle size. This further allows for the use of ion exchange systems, such as salt softeners, as filtration devices for the removal of crystallized ions associated with hardness. This further allowed for the functioning of the said ion exchange systems on as little as 25% of the regeneration normally required, diminishing the use of recharging chemicals. This concept applies to both cation exchange systems, previously mentioned, and anion exchange systems, such as resins used for the removal of nitrate. Thus, the combination of magnetic-based systems with filtration media such as ion exchange systems results in a totally new invention discovered herein.

As shown in FIG. 1, fluid exiting in pipe 5 passes through a filter 26 to remove any particles in the fluid stream. FIlter 26 may be of any conventional type such as paper, ion-exchange resin, magnetic, cloth, or other size exclusion media.

The discovery that added iron functions in stiochiometric ratios with divalent cations, allowed for the descaling of scaled surfaces within days instead of the months as normally required. Addition of iron salts also prevents the fouling of core member 15. As shown in FIG. 1, ferrous ions ($Fe^{+2}$) from an auxiliary source (not shown) of ferrous ions, such as from iron salts, are introduced into the fluid to be treated prior to the fluid passing through the magnetic lines of force F of core member 15. Ferrous ions ($Fe^{+2}$) are added in solution through a pipe 27 having check valve 28 therein. Typical iron salts from which the ferrous ions may be obtained include ferrous ammonium sulfate, ferrous sulfate, ferrous acetate, ferrous carbonate, ferrous oxalate, ferrous bicarbonate, and ferrous halides.

In addition of inhibiting the formation of scale, the present invention is also effective and useful for numerous other functions. For example, the present invention is useful for cathodic corrosion protection, control of pH, enhanced separation of emulsions, colloids, suspensions and supersaturated solutes, microbial sterilization of fluids, elimination of biological and chemical oxygen demand in wastewater, precipitation of toxic metals as insoluble oxides and electrolysis based chemical reactions.

The present design allows for the elimination of corrosion by principles of cathodic protection, but in magnitudes of applied chemical potential which far surpass those of magnesium or zinc, metals normally used for this function. Chemical potentials are produced by this design which exceed the decomposition potentials of water without their functioning in the decomposition of water. This allows for cathodic protection far surpassing any protection presently available either from potentials originating from production on metal surfaces or from inferior magnetic designs.

The present design allows for the electrolytic neutralization of fluids on either side of neutral by the following reactions:

$$2\ OH^- \quad 1/2\ O_2 + H_2O + 2\ e^-$$
$$2\ H^+ + 2\ e^- \quad\quad H_2$$

The observation that potentials and electron flow can be conveyed throughout the total volume of a fluid stream allow for a process for reaction catalysis of chemical processes where either acid or alkali is generated during the course of, and as a byproduct of, a chemical reaction controlled by equilibrium concepts. This process allows for electrolytic neutralization impossible for electrode systems where diffusion to the metal surface of the electrode is required. This process further eliminates the polluting byproduct streams from the said chemical manufacture, which are high in salts resulting from chemical neutralization.

The above-mentioned categories of solid-liquid or liquid-liquid dispersions arise where charge separation exists with more of one charge localized on the surface of the solute particles while counterbalancing opposite charges are dominant in the center of the species. Particles remain suspended due to the repulsion of like charges on the exterior which prevents combination of particles to form larger species which readily settle out. The application of potential and electron flow originating directly from the force field allows the neutralization of the peripheral charges on the exterior of the suspended particles, allowing them to combine and settle out. This phenomena is of extreme application to lagoon and settling basins in the treatment of waste water from industry.

The treatment of the reaction mixture in a supersaturated state from the onset of the reaction results in the early precipitation of crystalline seeds and has the overall effect of producing a purer, more easily filtered product, more completely precipitated from solution. This process has the added application to reactions between gases of a toxic nature, originating, as for example, from the burning of fuels (like sulfur dioxide), and scrubber solutions. Due to the generation of such gases in a charged state, resistance is found in the ability of scrubber solutions to remove them from the gaseous stream. The treatment of scrubber solutions allows the neutralization of gaseous charges at the interface of the gas-liquid junction, enhancing their neutralization. This process also has valuable application in the elimination of acid rain.

The invention allows for the process of microbial sterilization of fluids by observed oxidation potentials far in excess of the 1.4 volts associated with the chemical potential of chlorine in the chlorination of water. It thus substitutes for chlorination in the elimination of algae, iron reducing bacteria, sulfate reducing bacteria, slime molds, and other related microbes. This process is proven both by experimentation and by the observation of chemical potentials greater than those required for microbial sterilization.

Waste streams from industry containing oxidizable species consume oxygen as they degrade, resulting in harm to the environmental balance. Biological oxygen demand (BOD) values are eliminated by the oxidizing power of the electrolysis produced within the stream, either in once-through application or by repeated cycling through the system. Chemical potentials in excess of those associated with permanganate oxidations give similar results for chemical oxygen demands.

Toxic metals, such as iron and lead, form oxides of very limited solubility in water which readily precipitate upon oxidation. Manganese, when oxidized to the dioxide, exhibits similar behavior. The oxidation potentials, discussed previously, allow for the precipitation of the above and substances which exhibit similar characteristics, for removal by settling or by filtration.

Standard electrochemistry using electrode systems is useful, in a practical sense, only where the reactions to be carried out require lower chemical potential than the decomposition potential of the solvent. Potentials applied above the potential of solvent decomposition result in the selective destruction of the solvent over the alternate transformation desired.

The process of combining the unique type of electrolysis discussed herein with known chemical reactions permits these reactions to be carried out in virtually any solvent matrix. This invention includes the selective decomposition of organic and inorganic contaminants in fluid streams by the direct feeding of potential from the force field into the entire body of the stream, without appreciable solvent decomposition, at potentials far above those needed for electrolysis of the solvent in electrode systems. This invention makes possible, for instance, the selective decomposition of halogenated organic compounds in potable water or waste streams.

The present invention is not restricted to the decomposition of the class of substances discussed above, but on basis of known chemical potentials, includes the application of this process to all substances which cannot be decomposed in a practical manner within a given solvent matrix by standard electrode processes without decomposing the solvent in preference to the decomposition of the desired substrate.

The magnetohydrodynamic theory requires only that a conducting fluid crosses the force field with the proper geometry at an adequate velocity. However, in permanent magnet systems, where magnets are exposed electrically to the conductive fluid, action is retarded and stopped by corrosion of the magnets. This also is true for electromagnetic systems, where corrosion of the core stops the effects. Furthermore, coating of these cores with noncorrosive, metallic electrical conductors, such as nickel, totally stops the effectiveness of the magnetic treatment, even though nothing of importance to the magnetohydrodynamic theory is sufficiently altered. The magnetohydrodynamic theory is therefore an inadequate explanation of the results obtained from magnet-based fluid treatment systems. Such results further shed severe doubt on the validity of any design where direct contact, allowing Galvanic action between the fluid being treated and the magnetic core, is lacking. While the field and geometric flow considerations, discussed above in the context of magnetohydrodynamic theory, definitely function as a source of magnetic treatment effects, the proof of the real source of function allows for the improved designs and processes described herein.

Galvanic chemical potential from the magnetic core, conveyed directly to the fluid stream through proper encounters of ions with concentrations of flux, is the driving force for magnetic treatment of fluids. This effect far exceeds any minor effects which could be arising from magnetohydrodynamic concepts.

The finding that the chemical potential of a magnetic material in a magnetized state is altered by the field to assume new values of $E°$ (standard electrode potential) allowed for proof of the concepts of magnetic treatment. For instance, an iron core at approximately 2000 gauss readily reduces sulfate to sulfide at a pH of 7. This transformation requires a chemical potential from the iron core of approximately 2.0 volts assuming the Nernst relationship, concentration of sulfide at the square root of the constant of solubility product for iron sulfide ($6.3 \times 10^{-10}$ molar), and a sulfate concentration of $3.3 \times 10^{-4}$ molar. This observation requires an $E°$ for iron far in excess of the accepted value measured for unmagnetized iron.

The enhancement of E° of a magnetic material in a magnetized state is a function of the magnitude of flux flow through the core. The E° enhancements noted are independent of fluid flow relationships and must be regarded as a characteristic of the core in its magnetic circuit. This is proven in that no fluid flow is required for the observed transformation of sulfate to sulfide under the above conditions.

The potential observed, in its enhanced state, exhibits extreme specificity for reactants, with preference expressed for ionic species over neutral species such as water. Thus the above-mentioned transformation of sulfate to sulfide is smoothly carried out without appreciable electrolysis of the solvent, water. This specificity is nonexistent in the absence of field. The specificity mentioned here is also impossible to realize from electrode reactions or from magnetic units where the current is transferred to the fluid stream or media from generation within a metal surface (such as in rotating auger systems). Specificity is also noted between different ions within the field.

In order for the chemical potential of the core to be transmitted to the fluid stream and in order for electron flow to occur, the requirement for a vector component of flow in an angular relationship of 90° to field must be fulfilled. While potentials are determined by the enhanced potential concepts discussed above, electron flow, is directly proportional to the surface area of the core and to the efficiency of encounter between the conducting stream of fluid and the lines of force, providing a circuit is completed within the system.

Referring now to FIG. 3, there is illustrated a second embodiment of a magnetic fluid treatment device constructed in accordance with the present invention. The fluid treatment device, generally designated by the numeral 29, includes a conduit 30 through which the fluid being treated flows. Conduit 30 is composed of a non-magnetic, metallic, electrically conductive material such as stainless steel, copper, brass and the like. Conduit 30 is disposed in such a manner as to be electrically isolated or insulated from both the magnetic core assembly, as will hereinafter be described, and from the plumbing system in which the conduit is utilized. The downstream end or outlet end of conduit 30 has external threads thereon for receiving an internally threaded T-joint coupling member (not shown) identical to coupling member 3 previously described herein. The opposite end or upstream end of conduit 30 also has an identical coupling arrangement as that described for the first embodiment in FIG. 1 for securing the other end or inlet end of the conduit 30.

A series of three spaced electromagnetic coil assemblies 31-33 are disposed in concentric surrounding relation to conduit 30 and are insulated therefrom by an electrically insulating material 34 disposed between the coil assemblies 31-33 and conduit 30. The coil assemblies 31-33 are each capable of producing magnetic fields of at least 2000 gauss within the core, and include electrically insulated wires 35-37 wound around conduit 30, and a plurality of fins 38-40 respectively engage wires 35-37 to dissipate heat in a known manner. A source of air flow (not shown) may also be utilized to increase the heat transfer between wires 35-37 and fins 38-40 if desired. The coil wires 35-37 are each clad with a respective metallic housing or shunt 41-43 which surrounds coil wires 35-37 in a known manner. Housings 41-43 provide for completion of the magnetic circuit to minimize the ballooning of the force field at the high reluctance area between the ends of the core members and the points of flux emergence from and return to the coils. In addition, suitable terminals 44-46 are affixed to housings 41-43 for receiving conductors 47-49 which connect coil wires 35-37 to a source of electrical energy.

A core assembly 50 is disposed within conduit 30 and extends along the axis of conduit 30. As shown in FIG. 3, the core assembly includes a series of three cylindrical sections or core members 51 composed of a ferromagnetic material. Core members 51 may be of either a solid construction or of an iron powder-filled tubular construction. Core members 51 have a length equal to or less than the length of coil assemblies 31-33 thus allowing for large field capability. The metallic core members 51 each preferably comprise a short tubular member which has internal threads formed at each of its opposite ends for connection to a downstream coupling section 52 and an upstream coupling sections 53, as well as two short coupling sections 54 and 55 interconnecting the middle core member 51 with the two end core members 51. The coupling sections 52-55 are composed of a non-magnetic, non-metallic material, such as nylon. The coupling sections 52-55 are also generally cylindrical members which have external threads on each of their opposite ends for engaging the internal threads of core members 51 and for mounting core assembly 50 within conduit 30.

As shown in FIG. 3, a helical baffle 56 is disposed between coupling section 53 and conduit 30. Baffle 56 defines a helical flow path for the fluid to be treated as it passes through conduit 30. Baffle 56 is preferably composed of stainless steel and is fixed in position in any suitable manner, such as by tach welding at 57 the opposite ends of its flights to the inner surface of conduit 30. The radially inner edge or internal circumference of baffle 56 is spaced from coupling section 53 so that the latter may be removed and replaced if desired. A second helical baffle 58 is disposed between coupling section 52 and conduit 30. Baffle 58 is composed of the same material as baffle 56 and is fixed in position in the same manner as previously described. The only difference between baffle 58 and baffle 56 is that the distance between the flights of baffle 58 is less than the distance between the flights of baffle 56 so as to insure the provision of a circular flow pattern for the fluid to be treated. It should be particularly noted that the baffles 56 and 58 do not extend over or between core members 51 and conduit 30. This prevents the shorting of currents necessary for treatment effects between the ends of core members 51 conduit 30. Baffles 56 and 58 may also be composed of a plastics material such as nylon. In this latter case, baffles 56 and 58 may be molded integral with coupling sections 52 and 53 or connected thereto in any conventional manner. Also, the fluid treatment device shown in FIG. 3 may be utilized with a filter (not shown) on its outlet such as filter 26 referred to with respect to the first embodiment shown in FIGS. 1 and 2.

FIG. 3 also illustrates a grounding clamp 59 surrounding conduit 30 and connected to ground. Clamp 59 independently grounds conduit 30 from both the core assembly 50 and the plumbing system with which conduit 30 is utilized. This ground connection results in a powerful, directional electron pump capable of electron extraction from the source of fluid flow, as previously described.

In operation, coil assemblies 31-33 are energized by an alternating or direct current. This magnetizes the metallic tubular core members 51. As a result, magnetic lines of force F, as shown in FIG. 3, will extend generally at an angle of between 30° and 85° from the opposite ends of core members 51 to and between the lower ends of housings 41-43. In the case of direct current, the magnetic field will achieve a steady state condition while in the case of alternating current, the magnetic field will also be alternated.

Along with the energization of coil wires 35-37, fluid being treated will be delivered through conduit 30 generally in the direction of arrow 60. The fluid flowing through conduit 30 will follow the helical path defined by baffles 56 and 58. As the fluid, typically water, moves along this helical path, it will cross the magnetic lines of force F emanating from each of the ends of the metallic core members 51 and at an angle which approaches, and which preferably is, about 90°.

Referring now to FIG. 4, there is illustrated a third embodiment of a magnetic fluid treatment device constructed in accordance with the present invention. The fluid treatment device generally designated by the numeral 61, includes a conduit 62 through which the fluid being treated flows. Conduit 62 is composed of a non-magnetic, metallic, electrically conductive material such as stainless steel, copper, brass and the like. Conduit 62 is disposed in such a manner as to be electrically isolated or insulated from both the magnetic core assembly, as will hereinafter be described, and the plumbing system in which the conduit is utilized. The downstream end or outlet end of conduit 62 includes an outlet pipe 63 while the opposite end or upstream end of conduit 62 has an inlet pipe 64. Pipes 63 and 64 are composed of a non-magnetic, non-metallic material such as any well known plastics material like polyvinylchloride (pvc) in order to insulate conduit 62 from the remainder of the plumbing system (not shown).

An electromagnetic coil assembly 65 is disposed in concentric surrounding relation to conduit 62 and is insulated therefrom by an electrically insulating material 66 disposed between the coil assembly 65 and conduit 62. The coil assembly 65 is identical to those previously described herein and therefore are only schematically illustrated in FIG. 4. A plurality of fins (not shown) for heat transfer purposes may also be utilized.

A core assembly 67 is disposed within conduit 62 and extends along the axis of conduit 62. As shown in FIG. 4, the core assembly 67 includes a single cylindrical section or core member 68 composed of a ferromagnetic material. Core member 68 may be either of a solid construction or of an iron powder filled tubular construction. Core member 68 has a length equal to or less than the length of coil assembly 67 thus allowing for large field capability. The metallic core member 68 preferably comprises a short tubular member which has integral threads formed at one end for connection to a coupling section 69. The coupling section 69 is composed of a non-magnetic, non-metallic material such as nylon. The coupling section 69 is also a generally cylindrical member which has external threads on one end for engaging the internal threads of core member 68. The opposite end of coupling section 69 may be mounted in any conventional manner.

As shown in FIG. 4, an impeller 70 is disposed within conduit 62 to provide a helical flow path for the fluid to be treated as it enters conduit 62. Impeller 70 may be rotatably driven by a motor 71 to insure that the fluid to be treated takes on a helical flow path through conduit 62.

FIG. 4 also illustrates a grounding clamp 72 surrounding conduit 62 and connected to ground. Clamp 72 independently grounds conduit 62 from both the core assembly 65 and the plumbing system with which conduit 62 is utilized. Also, the fluid treatment device shown in FIG. 4 may be utilized with a filter (not shown) on its outlet such as filter 26 referred to with respect to the first embodiment shown in FIGS. 1 and 2.

In operation, coil assembly 67 is energized which magnetizes the metallic tubular core member 68. As a result, magnetic lines of force F will extend generally at an angle of between 30° and 85° from the opposite ends of the core member 68 to and between the lower ends of the shunt or housing of coil assembly 65. Along with the energization of the coil assembly 67, fluid being treated will be delivered through conduit 62 generally in the direction of arrow 73 into inlet pipe 64 and withdrawn through exit pipe 63. The fluid flowing through conduit 62 will follow the helical path provided by impeller 70 so that the fluid will cross the magnetic lines of force F at an angle which approaches, and which preferably is, about 90°.

Various modes of carrying out the invention are contemplated as being within the scope of the following claims particularly pointing out and distinctly claiming the subject matter which is regarded as the invention.

I claim:

1. A method of treating a fluid with magnetic lines of force, comprising the steps of:
   passing a fluid to be treated through a magnetic force field such that the fluid moves through the magnetic force field in a direction having a vector component at about a 90° relationship thereto by means of convoluting the flow of the fluid with baffle means located completely upstream from said magnetic force field; and
   introducing ferrous ions from an auxiliary source of ferrous ions into said fluid at a location prior to the fluid passing through the magnetic force field.

2. The method of claim 1, wherein said ferrous ions are derived from an iron salt.

3. The method of claim 2, wherein said iron salt is selected from the group consisting of ferrous ammonium sulfate, ferrous sulfate, ferrous acetate, ferrous carbonate, ferrous oxalate, ferrous bicarbonate, and ferrous halides.

4. A method of microbial sterilization of fluids, comprising the steps of:
   introducing a fluid to be treated into a conduit containing a core member within said conduit composed of a magnetic material and an electromagnetic coil surrounding said conduit;
   energizing the coil to produce a magnetic field of at least about 2000 gauss between said core member and said coil; and
   passing fluid through said magnetic field such that the fluid crosses the magnetic lines of force in a direction having a vector component at about 90° relationship therewith, said last mentioned step comprising convoluting the flow of the fluid as it passes through said conduit at a location completely upstream from said coil by baffle means located upstream of said core member and not extending over the core means or between the core means and the conduit.

5. A method of eliminating biological oxygen demand values from a fluid, comprising the steps of:

introducing a fluid to be treated into a conduit containing a core member within said conduit composed of a magnetic material and an electromagnetic coil surrounding said conduit;

energizing the coil to produce a magnetic field of at least about 2000 gauss between said core member and said coil; and passing the fluid through said magnetic field such that the fluid crosses the magnetic lines of force in a direction having a vector component at about 90° relationship therewith, said last mentioned step comprising convoluting the flow of the fluid as it passes through said conduit at a location completely upstream from said coil by baffle means located upstream of said core member and not extending over the core means or between the core means and the conduit.

6. A method of precipitating metals from a fluid, comprising the steps of:

introducing a fluid to be treated into a conduit containing a core member within said conduit composed of a magnetic material and an electromagnetic coil surrounding said conduit;

energizing the coil to produce a magnetic field of at least about 2000 gauss between said core member and said coil; and passing the fluid through said magnetic field such that the fluid crosses the magnetic lines of force in a direction having a vector component at about 90° relationship therewith, said last mentioned step comprising convoluting the flow of the fluid as it passes through said conduit at a location completely upstream from said coil by baffle means located upstream of said core member and not extending over the core means or between the core means and the conduit.

7. A method of controlling the pH of a fluid, comprising the steps of:

introducing a fluid to be treated into a conduit containing a core member within said conduit composed of a magnetic material and an electromagnetic coil surrounding said conduit;

energizing the coil to produce a magnetic field of at least about 2000 gauss between said core member and said coil; and passing the fluid through said magnetic field such that the fluid crosses the magnetic lines of force in a direction having a vector component at about 90° relationship therewith, said last mentioned step comprising convoluting the flow of the fluid as it passes through said conduit at a location completely upstream from said coil by baffle means located upstream of said core member and not extending over the core means or between the core means and the conduit.

8. A device for treating a fluid by abstraction of electrons of a regulated voltage from substrates in the fluid said device including:

conduit means composed of a non-magnetic, electrically conductive material, said material capable of accepting electrons directly from the fluid being treated;

electromagnetic coil means, energizable by a source of electrical energy, surrounding the conduit means, said coil means capable of inducing a voltage on the conduit of such a polarity as to cause the conduit to accepts electrons directly from the fluid being treated;

core means disposed within said conduit means having a magnetic core member exposed directly to the fluid being treated, said core means comprised of any magnetic material which exhibits an enhanced standard electrode potential in its magnetic state over that exhibited in its non-magnetic state, said core means of an overall length less than that of the coil means and disposed without metal-to-metal contact with the conduit;

flow control means comprised of a non-magnetic material and disposed within said conduit means for providing a convoluted flow path for the fluid as it flows through the said conduit means, and located axially such as not to extend over any portion of the magnetic core member nor to provide a metal-to-metal path for electron flow between the magnetic core member and the conduit.

9. The device of claim 8 wherein said coil means includes a plurality of axially spaced electromagnetic coils of the same polarity surrounding said conduit means, said coils spaced apart at a distance of at least the inner diameter of the conduit, and wherein said core means comprises a plurality of endwise spaced, axially aligned core members of a ferromagnetic material and non-magnetic coupling members for interconnecting the same, wherein the resulting combination of coils and magnetic core members produce opposite polarities between adjacent poles of the magnetic core members, and a plurality of flow control means, each located axially such as not to extend over any portion of a magnetic core member.

10. The device of claim 9 wherein the magnetic core members of the said core means are axially offset downstream from the said coil means.

11. The device of claim 9 wherein said flow control means comprises a helical baffle means located axially such as not to extend over any portion of the magnetic core member nor to provide a metal-to-metal path for electron flow between the magnetic core members and the conduit.

12. The device of claim 9 wherein said core means, with one or more segments attached thereto, is removably mounted within the conduit means.

13. The device of claim 9 wherein said flow control means comprises a stirring mechanism imparting circular motion without a forward component of flow.

14. The device of claim 9 further including gaps in the magnetic circuit, said gaps being formed in the space between magnetic shrouding about the coil, where said shrouding meets the non-magnetic conduit means, and the polar ends of the magnetic core members of the core means.

15. The device of claim 9 wherein the magnetic core members are coated, as by electroplating, with less corrosive electrical conductors and electrical energy is fed directly onto the said magnetic core members from an outside source of electrical energy.

16. A method for scale prevention, scale removal, for the elimination of tastes, odors, and algae in aqueous fluids, and for the prevention of corrosion, comprising the steps of:

energizing the coil of the device of claim 28 to produce a magnetic field of at least about 2000 gauss at the polar ends of the magnetic core members, passing the fluid to be treated from a grounded source without metal-to-metal contact between the source and the device of claim 9, through the device of claim 28, without breaks in the column of fluid being thusly transferred.

17. The method of claim 16 wherein the destination of flow comprises a grounded vessel without metal-to-metal contact with the device of claim 9, and without breaks in the column of fluid being thusly transferred.

18. The method of claim 16 wherein the source of flow and the destination of flow are the same.

19. A method for enhancing antiscaling effects, for the prevention of fouling of electron-transfer surfaces of magnetic-based fluid treatment systems, and for the transformation of dissolved solids in a fluid to particulate forms, comprising the steps of:
  passing the fluid to be treated through a conduit having an induced voltage of such a polarity as to accept electrons from the fluid, said conduit containing a core means of magnetic composition, in a magnetized state, with a voltage of such a polarity as to promote the donation of electrons to the fluid, the said core means and conduit lacking a metal-to-metal path for electron flow between one another, with fluid flow at such a direction as to cross the force field of the magnetic core means at such an angle as to give a vectoral component of flow in 90° relationship to the field, and
  introducing ferrous ions, with a +2 oxidation state, by means of a solution of iron (+2) salts prior to the encounter of the fluid with a region between the said core means and the conduit.

20. The method of claim 19, wherein said iron solution is introduced from a grounded source.

21. A method for the microbial sterilization of fluids, the elimination of biological oxygen demand values from a fluid, precipitating metals from a fluid, controlling the pH of a fluid, enhancing settling rates of suspended solids in a fluid, the selective decompositon of organic and inorganic contaminants in a fluid, the settling out of liquid-liquid and solid-liquid dispersions, the precipitation of crystalline products from a reaction mixture, enhancing the ability of scrubber fluids to absorb gases, comprising the steps of:
  passing the fluid to be treated from a grounded source without breaks in the column of fluid being transmitted, through a conduit having an induced voltage of such a polarity as to accept electrons from the fluid, said conduit containing a core means of magnetic composition, in a magnetized state, with a voltage of such a polarity as to promote the donation of electrons to the fluid, the said core means and conduit lacking a metal-to-metal path for electron flow between one another with fluid flow occurring at such a direction as to cross the force field of the magnetic core means at such an angle as to give a vectoral component of flow in 90° relationship to the field.

22. The method of claim 21 wherein the destination of flow comprises a grounded vessel without metal-to-metal contact with either the said core means or conduit, and the fluid is transferred to the destination of flow without breaks in the column of fluid being transferred.

23. The method of claim 22 wherein the source of flow and the destination of flow are the same.

24. A method for enhancing the ion absorption capability of ion exchange systems, said method comprising the method of claim 22 wherein the outlet is connected directly to an ion exchange system, with the fluid passing therethrough.

25. A method for removing dissolved minerals from a fluid comprising the steps of:
  adjusting iron (+2) levels in the fluid to be treated to values in stiochiometric ratios to the cationic species in the fluid,
  treating the fluid to be demineralized as described in claim 22, and
  removing minerals by their adherence to a magnetized surface.

26. A device for treating a fluid with magnetic lines of force, said device including:
  conduit means through which the fluid passes;
  electromagnetic coil means surrounding the conduit means;
  core means disposed within said conduit means and including a core member of magnetic material; and
  flow control means disposed within said conduit means upstream from said coil for providing a convoluted flow path for the fluid as it flows downstream therefrom through said conduit means, said flow control means comprises a helical baffle means located upstream of said core member and not extending over the core means or between the core means and the conduit.

27. The device of claim 26 wherein said coil means includes a plurality of axially spaced electromagnetic coils surrounding said conduit means, and said core means comprises a plurality of endwise spaced, axially aligned core members of a ferromagnetic material and non-magnetic coupling members disposed between the tubular members for interconnecting the same, said plurality of core members each disposed such that a portion thereof is offset axially downstream from its corresponding coil.

28. The device of claim 27 wherein said core means is removably mounted within said conduit means.

29. The device of claim 26 wherein said coil is connected to a source of alternating electrical energy.

30. The device of claim 26 wherein said flow control means comprises a driven impeller located upstream of said core member.

31. The device of claim 26 further including a metallic housing surrounding said coil means, said housing including a pair of lower end portions disposed at opposite ends of said coil means adjacent said conduit means and said core member is axially offset to a downstream position wherein magnetic lines of force extend from opposite ends thereof to said lower end portions of said housing and are concentrated substantially along a plane disposed at an angle of between 30° and 85° with respect to the axis of said core member.

32. The device of claim 26 wherein the axial length of said core member is equal to or less than the axial length of said coil means.

33. The device of claim 26 further including filter means located downstream of said core means.

34. A device for treating a fluid with magnetic lines of force, said device including:
  conduit means through which the solution passes;
  electromagnetic coil means surrounding the conduit means;
  core means disposed within said conduit means and including a core member of magnetic material;
  flow control means disposed within said conduit means upstream of said core means for providing a convoluted flow path for the fluid as it flows through said conduit means, said flow control means is a helical baffle located upstream of said core member and not extending over the core means or between the core means and the conduit; and grounding means connected to said conduit means for grounding said conduit means.

35. The device of claim 34 wherein said coil means includes a plurality of axially spaced electromagnetic coils surrounding said conduit means, and said core means comprises a plurality of endwise spaced, axially aligned core members of a ferromagnetic material and non-magnetic coupling members disposed between the tubular members for interconnecting the same, said plurality of core members each disposed such that a portion thereof is offset axially downstream from its corresponding coil.

36. The device of claim 35 wherein said core means is removably mounted within said conduit means.

37. The device of claim 34 wherein said coil is connected to a source of alternating electrical energy.

38. The device of claim 34 wherein said flow control means is a driven impeller located upstream of said core member.

39. The device of claim 34, further including a metallic housing surrounding said coil means, said housing including a pair of lower end portions disposed at opposite ends of said coil means adjacent said conduit means and magnetic lines of force extend from the lower end portions of said housing to opposite ends of said core member and are concentrated substantially along a plane disposed at an angle of between 30° and 85° with respect to the axle of said core member.

40. The device of claim 34 wherein the axial length of said core member is equal to or less than the axial length of said coil means.

41. The device of claim 34 further including filter means located downstream of said core means.

* * * * *

UNITED STATES PATENT AND TRADEMARK OFFICE
CERTIFICATE OF CORRECTION

PATENT NO. : 4,879,045

DATED : November 7, 1989

INVENTOR(S) : Terry L. Eggerichs

It is certified that error appears in the above-identified patent and that said Letters Patent is hereby corrected as shown below:

Claim 16, Col. 16, Line 5, after "claim" delete "28" and substitute therefore --- 9 ---; Claim 16, Col. 17, Line 1, after "claim" delete "28" and substitute therefore --- 9 ---.

Signed and Sealed this

Twenty-eighth Day of May, 1991

Attest:

HARRY F. MANBECK, JR.

Attesting Officer

Commissioner of Patents and Trademarks